United States Patent [19]
Rogers et al.

[11] Patent Number: 5,837,936
[45] Date of Patent: Nov. 17, 1998

[54] ELECTRICAL OUTLET BOX WITH BASE AND SNAP-ON COVER FOR USE WITH ELECTRICAL METAL TUBE (EMT)

[75] Inventors: Wilfred R. Rogers, Bristol; Salvatore A. Cancellieri, Plainville, both of Conn.

[73] Assignee: The Wiremold Company, West Hartford, Conn.

[21] Appl. No.: 864,345

[22] Filed: May 28, 1997

[51] Int. Cl.⁶ .................................................. H02G 3/18
[52] U.S. Cl. ........................................ 174/65 R; 220/3.6
[58] Field of Search ................... 174/53, 66, 48, 174/50, 57, 58, 60, 65 R; 220/3.6, 3.8, 4.02, 241, 242, 3.3

[56] References Cited

U.S. PATENT DOCUMENTS

| | | | |
|---|---|---|---|
| 1,604,237 | 10/1926 | Platt | 220/3.8 |
| 3,437,738 | 4/1969 | Wagner | 174/55 |
| 3,444,345 | 5/1969 | Mackiewicz | 200/295 |
| 3,689,868 | 9/1972 | Snyder | 439/501 |
| 3,852,514 | 12/1974 | Lauben | 174/58 |
| 4,529,834 | 7/1985 | Nattel | 174/53 |
| 5,223,673 | 6/1993 | Mason | 174/53 |

*Primary Examiner*—Kristine L. Kincaid
*Assistant Examiner*—Dhiru R. Patel
*Attorney, Agent, or Firm*—McCormick, Paulding & Huber

[57] ABSTRACT

A mild steel outlet box is stamped from flat sheet stock into a base and a cover that fit together with an interference fit that avoids the need for threaded fasteners. The base has circular knock-outs in the side and end walls, each of which is aligned with a knock-out slot in the bottom wall to allow an electrical metal tube (EMT) to be secured to the box without the usual offset bend. Each such knock-out opening also has a set screw threadably received in an integrally formed land aligned with the knock-out opening to secure the tubing to the base. An electrical device can be pushed into place without threading its fasteners. Hardened steel clips are mounted to the base for slidably receiving such fasteners so they must be unthreaded for removal. Each clip has a V-shape with the apex of the V defining a slotted opening that so receives the threaded fastener.

20 Claims, 5 Drawing Sheets

ELECTRICAL OUTLET BOX WITH BASE AND SNAP-ON COVER FOR USE WITH ELECTRICAL METAL TUBE (EMT)

BACKGROUND OF THE INVENTION

The present invention relates to the fabrication of metal outlet boxes of the type used with electrical metal tubing (EMT), and deals more particularly with a box comprising a metal base adapted for assembly with a metal cover to form a box that does not require the tube running into the box to be offset or otherwise deformed for assembly of the tube and box on a preexisting wall structure or the like.

DESCRIPTION OF THE PRIOR ART

In a typical metal outlet box of the type now used with electrical metal tubing (EMT), a relatively flat base is secured to a wall structure or the like by conventional threaded fasteners or screws, and a cover is then secured to the base again by the use of conventional fasteners. Knock-out openings are generally provided in the cover, and typically the metal tubing must be offset so as to be received in these knock-out openings. The portion of the tubing provided inside the resulting box may be clamped or otherwise secured to the box as shown for example in U.S. Pat. No. 4,082,915 issued to Silver on Apr. 4, 1978. Such a prior art construction requires that the metal tubing be provided with an offset adjacent to the box if the tubing is to run along the same wall to which the electrical outlet box is secured.

While the above-mentioned prior art patent illustrates a one-piece electrical outlet box, surface mount wireways generally provide for a two-piece electrical outlet box construction such that the base is first secured to the wall structure and the rest of the box is provided in the form of a cover that is in turn secured to the base by conventional fasteners. Although no single prior art reference is available for illustrating such a construction, an improvement to that conventional construction is shown and described in a copending application Ser. No. 08/436,613 filed on May 8, 1995 and entitled Metal Outlet Box with Snap Together Base and Cover. Said pending application is assigned to the assignee herein and is incorporated by reference in this application. However, that construction shows a quite different approach to snapping a cover onto a base, and for reasons that will be apparent hereinafter does not afford the degree of improvement and the ease of installation provided for in the improvement to be described. That application is incorporated by reference, however, for its unique cover construction.

SUMMARY OF THE INVENTION

A general purpose and object of the present invention is to provide a unique metal electrical outlet box configuration having a cover that snaps onto a base without the need for threaded fasteners. The outlet box is also adapted for use with electrical metal tubing (EMT) which can be secured to the box without the usual need for offsetting the tubing so both the box and the tube can be secured to a wall.

This object is accomplished in accordance with the present invention by providing an electrical outlet box comprising a mild steel base having an upwardly open box configuration with opposed side and end walls, and with a bottom wall integrally connected to these opposed side and end walls. Both the bottom wall and the side and end walls have knock-out openings or slots for receiving the electrical tubing in a configuration that allows the electrical tubing to remain flush with the wall and avoids the necessity for any offset bend in such tubing.

The side and end walls of the base have inwardly offset panels or flanges integrally connected thereto so as to allow a cover of the same geometry as the base to be received thereon. The cover is also formed from mild steel sheet stock into a rectangular configuration with side and end walls such that the side and end walls of the cover fit over the panels or flanges provided in the side and end walls of the base. An interference fit is provided therebetween preferably in the form of detents and dimples provided for this purpose on these flanges and on the overlapping side and end walls of the cover.

Typical prior art constructions for such electrical metal outlet boxes generally require that the electrical outlet device itself be provided in the cover and more particularly, in a top opening of the cover, and that a faceplate be provided on top of the cover to define the finished box, the present invention avoids the necessity for such a faceplate, and provides for mounting of the electrical outlet box directly on the base prior to installing the cover.

In further accordance with the present invention, means is provided for receiving the electrical device in the base by threaded fasteners which need not be threaded into position, but can be pushed into position as a result of unique hardened steel clips provided on the base, and more particularly on legs integrally defined with the base end walls.

Finally, the electrical metal tubing is held in place by set screws which are threadably received in integrally defined lands provided for this purpose in the base side and/or end walls.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF FIGS. 1–9

FIGS. 1–9 illustrate a preferred embodiment of the present invention. Electrical outlet boxes fabricated from metal generally start off as mild steel sheet stock which is bent into the desired configuration. In the case of surface mount EMT systems such a box requires fabrication of a base from such stock and fabrication of a cover that is secured to the base by fasteners. The cover is generally adapted to support the electrical component or device such as the duplex plug illustrated in FIG. 4 for example. See co-pending application Ser. No. 08/436,613. A metal box is shown having a base which is adapted to be secured to a wall structure, and having a cover portion of this type (that is, having a cover adapted to support the electrical device which is to be supplied with electrical power from wires contained in a tubular conduit, or in the case of said pending application, a surface mounted two-piece raceway with base and cover).

In the present invention, the electrical box to be described is intended for use with electrical metal tubing (EMT) rather than with raceway components of the type adapted for use with the metal outlet box in said copending application Ser. No. 08/436,613.

Figure 1:
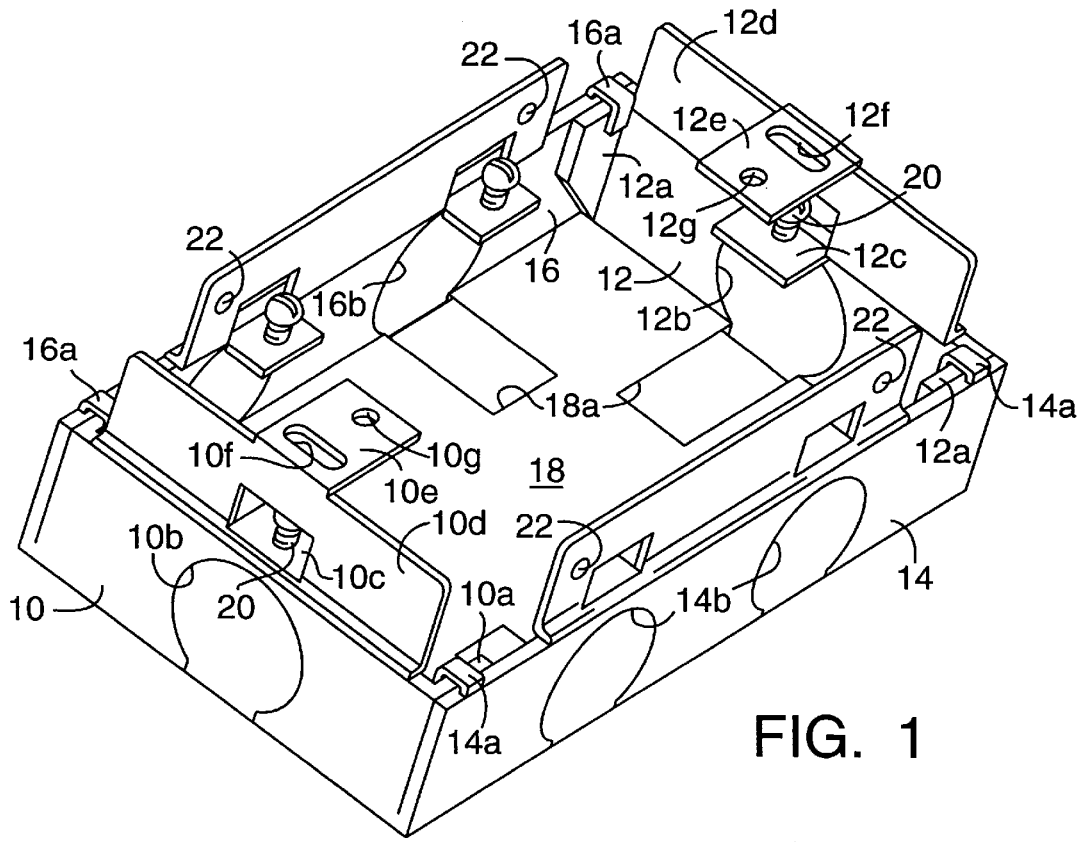
FIG. 1 is a quartering top perspective view illustrating the base which is formed from a mild steel sheet stock material into an upwardly open rectangular box configuration for receiving an electrical device such as a duplex outlet plug, and a snap-on cover which mates with the box base.

As shown in FIG. 1, the base portion of the outlet box comprises an upwardly open rectangular box formed or stamped from flat sheet stock of mild steel into a shape which includes opposed end walls 10 and 12 each of which end walls includes corner portions 10a and 12a that serve to strengthen the four corners of the box. The rectangular box further includes opposed side walls 14 and 16 each of which further include tabs 14a and 16a adjacent the end portions thereof which tabs are adapted to be clinched over the corner portions 10a and 12a associated with the end walls 10 and 12 of the rectangular box.

Figure 3:
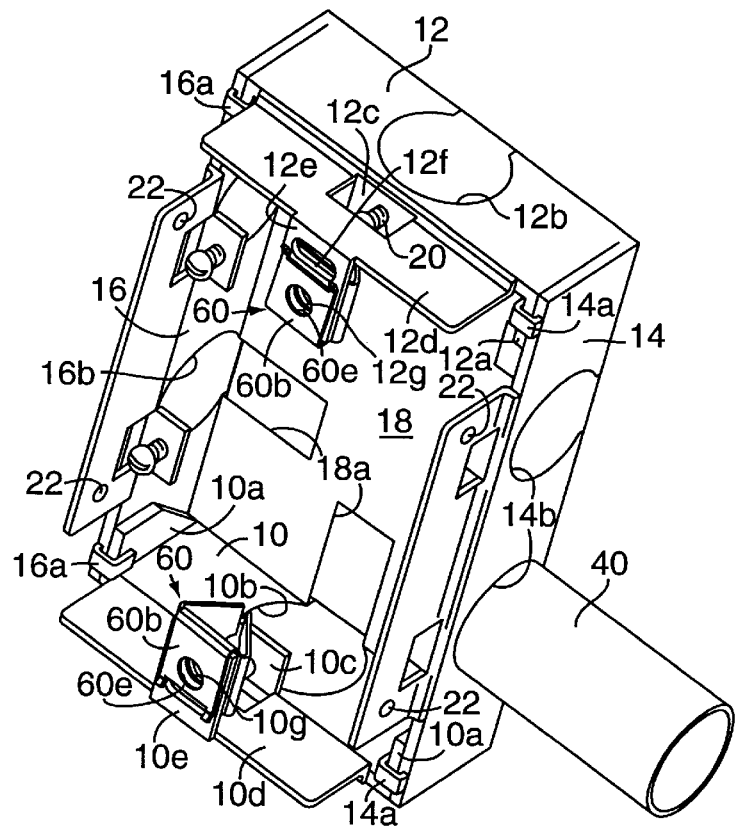
FIG. 3 is another perspective view of the metal base with the spring clips in place, and with a length of electrical metal tubing connected to the base in accordance with the present invention.

Still with reference to the rectangular box configuration for the base illustrated in FIG. 1, a bottom wall 18 of the base is integrally connected to the opposed side and end walls and defines rectangularly by shaped knock-out openings or slots 18a. Each slot 18a is aligned with a knock-out opening in the side and end walls. More particularly, these knock-out slots are provided in alignment with circular knock-out openings 10b and 12b associated with the end walls and similar openings 14b and 16b associated with the side walls of the base. Electrical tubing can be provided in these openings, as for example the opening defined by the rectangular slot 18a and 14b, by knocking out the associated knock-outs provided for this purpose and inserting the tube into the box so as shown in FIG. 3. The tube is oriented tangent to the same surface to which the base is secured. Although not shown, the base includes conventional openings for providing screw fasteners (not shown) to secure the base to a wall structure.

An important feature of the present invention is attributable to the fact that the base of FIG. 1 provides a convenient and novel means for securing the EMT tubing to the outlet box. More particularly, inwardly projecting lands 10c, and 12c in the end walls 10 and 12 respectively are provided in alignment with and immediately above the slots 18a provided in the bottom wall of the base. Each inwardly projecting land 10c and 12c is provided with a threaded opening for receiving a set screw 20 that can be used to clamp the tube in place (See FIG. 3) once the knock-outs associated with the openings 18a and 18a have been configured for this purpose.

As mentioned previously, the base of FIG. 1 is fabricated from initially flat mild steel sheet stock, and these lands 10c and 12c are formed integrally in the same sheet stock by reason of a stamped opening provided for this purpose in each of the end walls 10 and 12 respectively.

Figure 5:
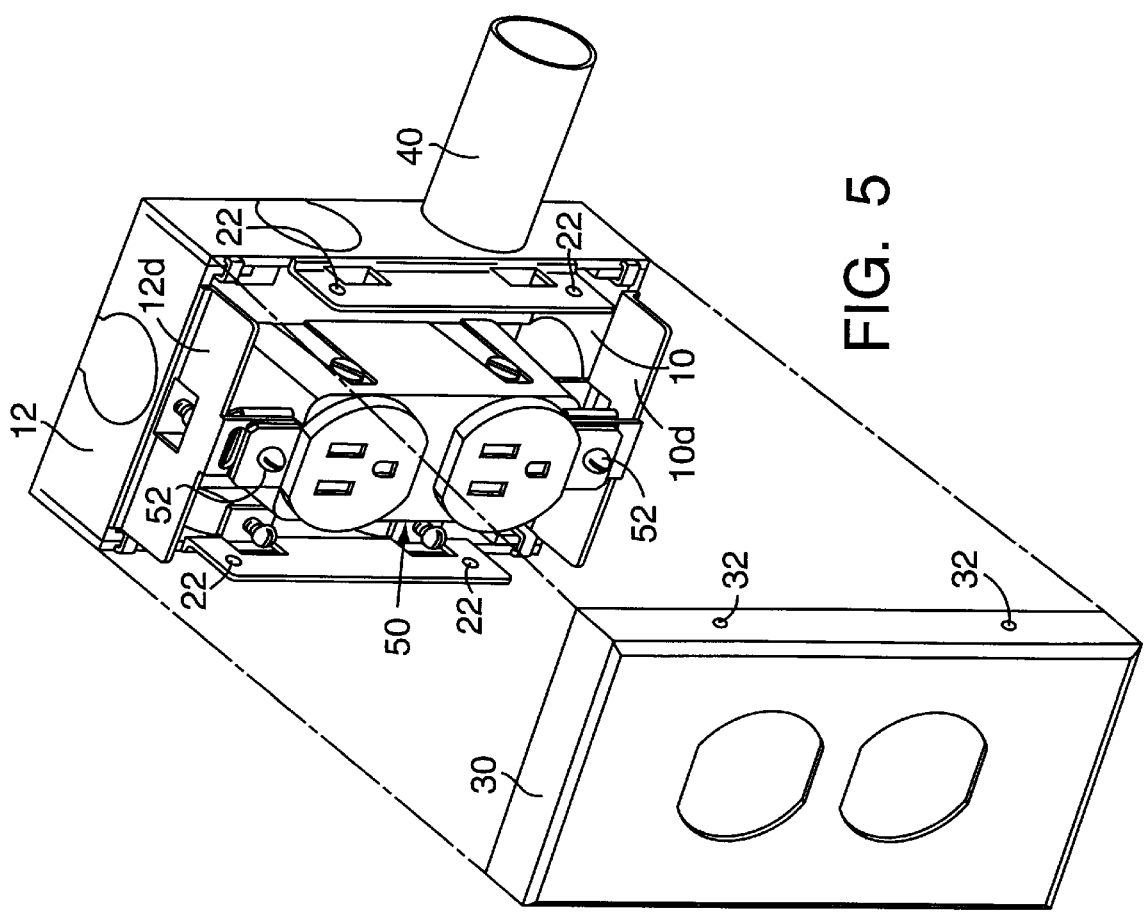
FIG. 5 is an exploded view illustrating the duplex plug mounted in the box base with a snap-on cover in accordance with the present invention the cover being shown in position for snapping onto the base.

Another important feature of the present invention can be attributed to the fact that the mild steel stock from which the base is fabricated also is provided with upwardly projecting offset flanges or panels 10d and 12d which offset panels or flanges served to define a locating means for receiving the rearwardly open rectangular cover 30 as suggested in FIG. 5.

The side walls 14 and 16 of the base are also provided with similarly formed flanges or panels, and one or the other or both of such flanges or panels are preferably provided with dimples or detents such as illustrated generally at 22 that serve to cooperate with corresponding detents or dimples in the rectangular cover 30 as indicated generally at 32 in FIG. 5. This configuration provides an interference fit for the cover 30 to be secured to the base of FIG. 1 without the need for threaded fasteners or the like.

Figure 4:
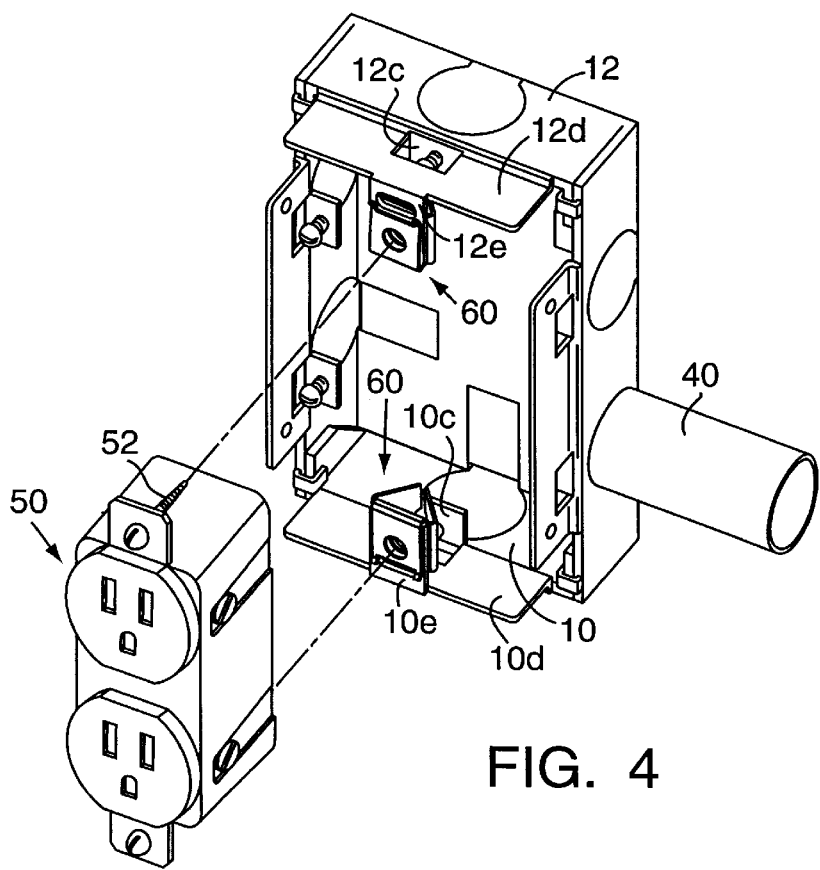
FIG. 4 is a perspective view of the metal base for a box of the present invention with the steel clips in place as shown in FIG. 3, and also illustrating an electrical device in the form of a duplex plug adapted to be mounted to the base as suggested by the broken lines in this view.

FIG. 4 shows the base of FIG. 1 with an electrical tube or EMT 40 secured in one side wall thereof. This view also shows a duplex plug in position for mounting in the base prior to the mounting of the snap-on cover 30 as described above. The electrical device 50 has conventional screw fasteners 52 associated therewith, and the screw fasteners are adapted to be pushed into place and to be received by hardened steel clips 60, 60 that are mounted to the end walls of the base in a manner to be described. As best shown in FIG. 1, the base is preferably provided with inwardly projecting legs 10e and 12e which legs are integrally formed in the panel portions 10d and 12d respectfully of the end walls 10 and 12. These legs 10e and 12e are located immediately above the lands 10c and 12c which receive the set screws 20, 20 that are adapted to anchor the EMT or tubing in one or the other of the knock-out openings associated with these end walls as required at installation. Each inwardly bent leg 10e and 12e is itself provided with a clearance opening (10f and 12f respectfully) that allows access to the underlying set screw 20, 20. Each such inwardly bent leg 10e and 12e further includes a fastener opening (10g and 12g) respectfully that is adapted to receive one of the screw fasteners 52 associated with the electrical device to be mounted in the box as described previously. Obviously, the openings 10g and 10f in the end wall 10 could be configured differently, and might even comprise a single opening in the leg 10e depending upon the clearance required for receiving the fastener 52 and/or providing access to the set screw 20.

Figure 7:
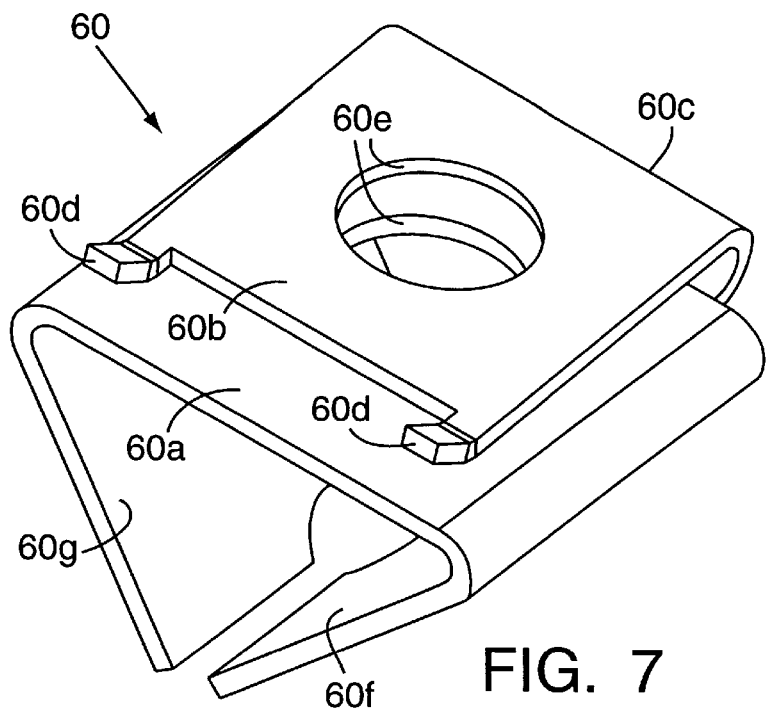
FIG. 7 is a perspective view of one of the spring steel mounting clips used in providing a push-in mounting for the electrical device or duplex plug.
Figure 8:
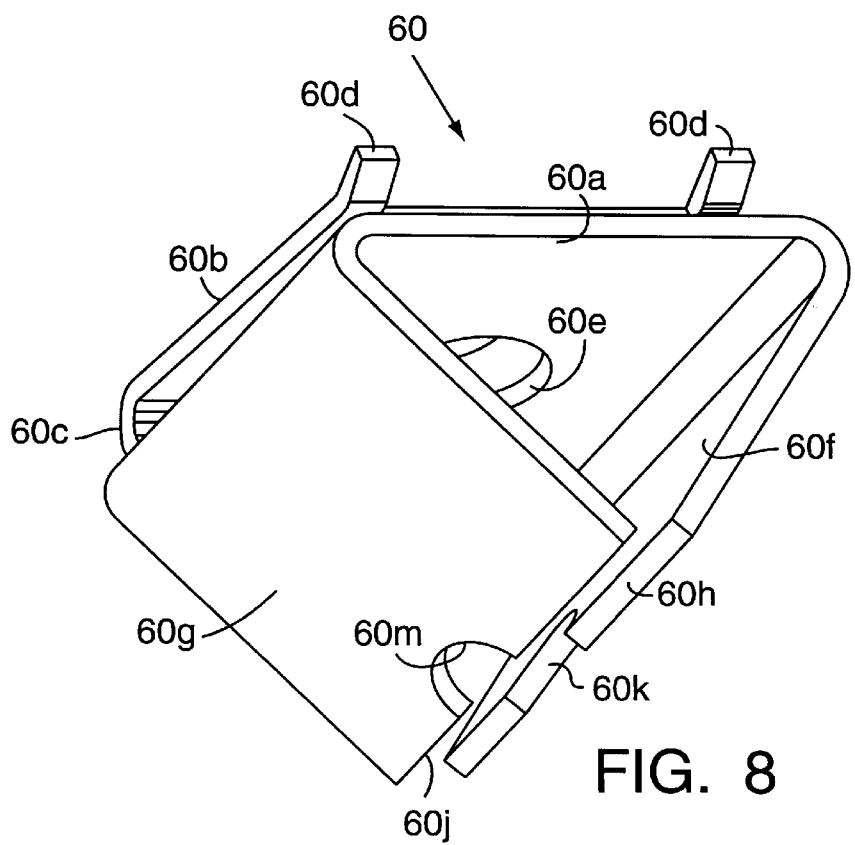
FIG. 8 is a perspective view of the clip of FIG. 7 from below.
Figure 9:
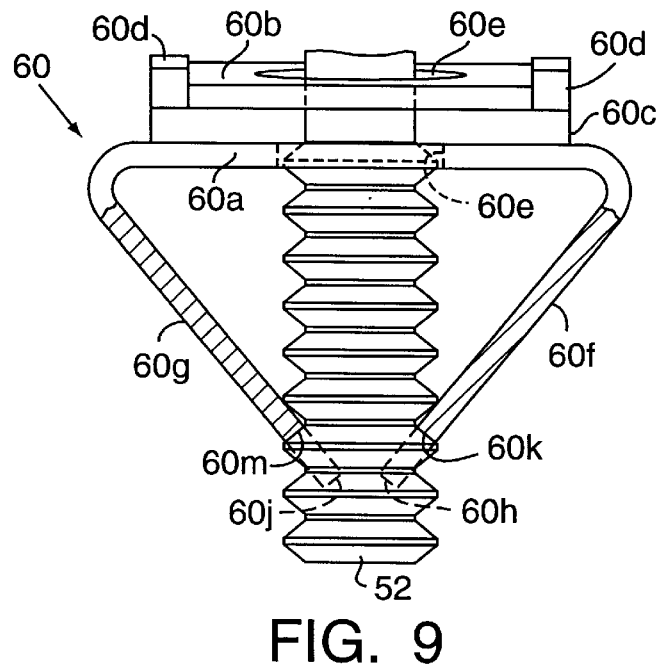
FIG. 9 is a cross-section view illustrating the clip of FIGS. 7 and 8 with a threaded fastener having been pushed into position so that the clip secures the threaded fastener in a manner that allows push-in assembly but requires unthreading for disassembly.

Turning now to a more detailed description of the hardened steel spring clips 60, and referring more particularly to FIGS. 7, 8 and 9, the spring clips 60, 60 comprise integrally formed hardened steel components each with a U-shaped upper clip portion defined by generally parallel planer portions 60a and 60b that are integrally connected to one another at the base of the U-shape as indicated generally at 60c, and that define an open end which is more particularly provided with an enlarged lead-in opening for receiving the legs 10e and 12e of the base end walls as described previously. Upturned lead-in tabs 60d are provided in the wall portion 60b adjacent the open end of the U as best shown in FIG. 7.

Still with reference to the U-shaped portion of the hardened steel fastener receiving device or clip, clearance holes 60e are provided in both panels or wall portions 60a and 60b of this clip portion to allow the screw fastener 52 to be loosely received therein, and hence to allow mounting of the electrical device in the box or base without need for threading the fasteners 52 in place.

The fastener screws 52 are secured in the hardened steel clip or fastener receiving device as best shown in FIG. 9 by reason of the fact that depending V-shaped panel portions 60f and 60g are integrally formed in the hardened steel clip and designed to flex outwardly upon insertion of the screw fastener 52, and to flex inwardly toward one another so as to close the slot defined by their lower edges for engaging the threads of the fastener 52. Thus, the slot defined at the free ends of the resilient panels 60f and 60g requires unthreading of the fastener upon removal of the screw 52.

As best shown in FIG. 8, each of the panel portions 60f and 60g of the hardened steel clip 60 are integrally connected to the bottom wall 60a of the U-shaped upper clip portion, and each of these panels 60f and 60g further includes free edge portions 60h and 60j respectively, which cooperate with one another to define said slot for receiving the fastener 52. More particularly, each of these free edges 60h and 60j further defines an arcuate pitched or canted edge 60k and 60m respectively, that is so angled as to engage the thread of the fastener 52 and prevent removal of the fastener 52 in any manner other than by imparting to that fastener an unthreading rotational motion.

Figure 2:
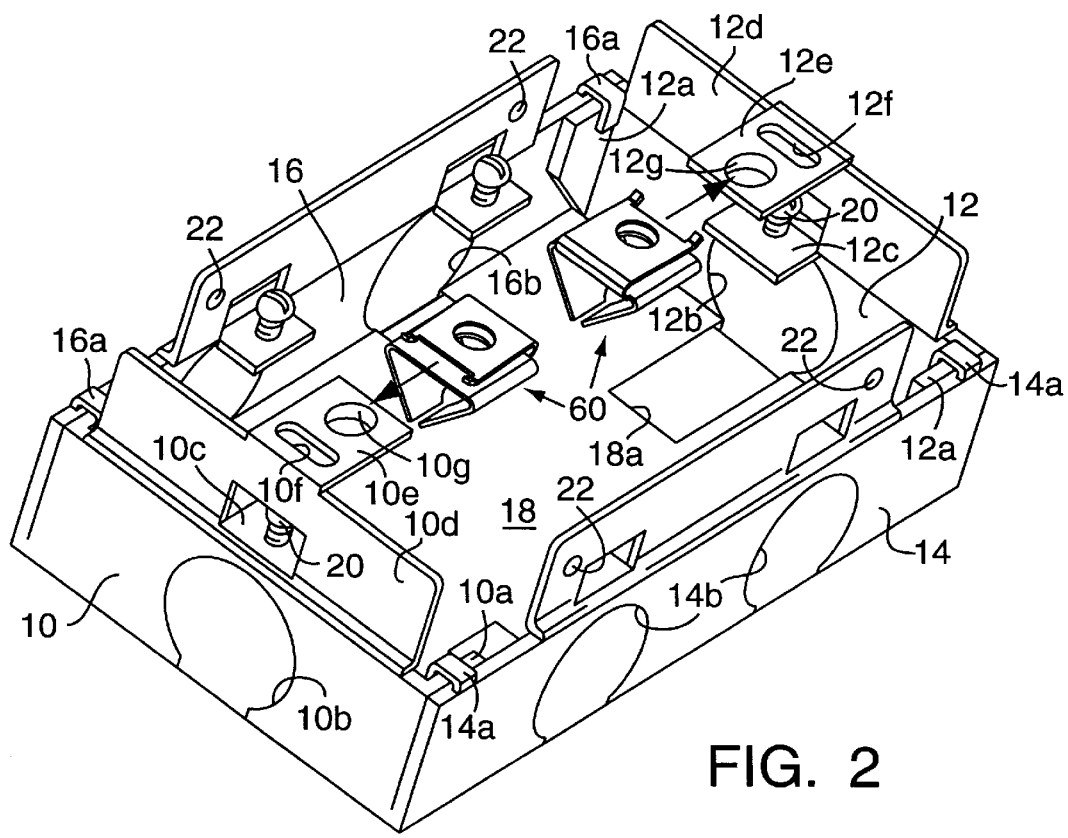
FIG. 2 is a perspective view similar to that of FIG. 1, but also illustrating a pair of hardened steel spring clips which are adapted to be received on the projecting leg portions of the box as suggested by the broken lines linking these spring clips with such legs.
Figure 6:
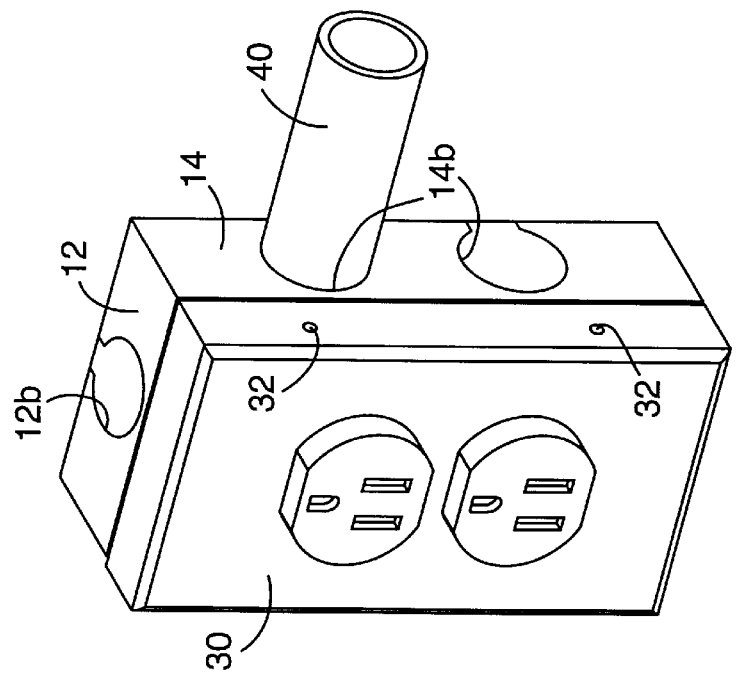
FIG. 6 is a perspective view of the assembled electrical outlet box with duplex plug and with a length of electrical metal tubing secured to the box.

FIG. 2 illustrates the clips 60, 60 prior to assembly on the base. The broken lines and arrows illustrate how the clips are mounted on the legs 10e and 12e of the end walls 10 and 12 for providing a switch base such as that illustrated in FIG. 3. When the clips 50 are assembled an electrical device or duplex plug 60 are can be pushed into place as suggested in FIG. 4. Following these assembly steps, the cover 30 is snapped into place as suggested in FIG. 5. The resulting assembly is shown in FIG. 6. Note that the entire assembly process can be accomplished without any necessity for tools, and without requiring any threaded fasteners to be rotated by the person doing the assembly.

DETAILED DESCRIPTION OF FIG. 10

Figure 10:
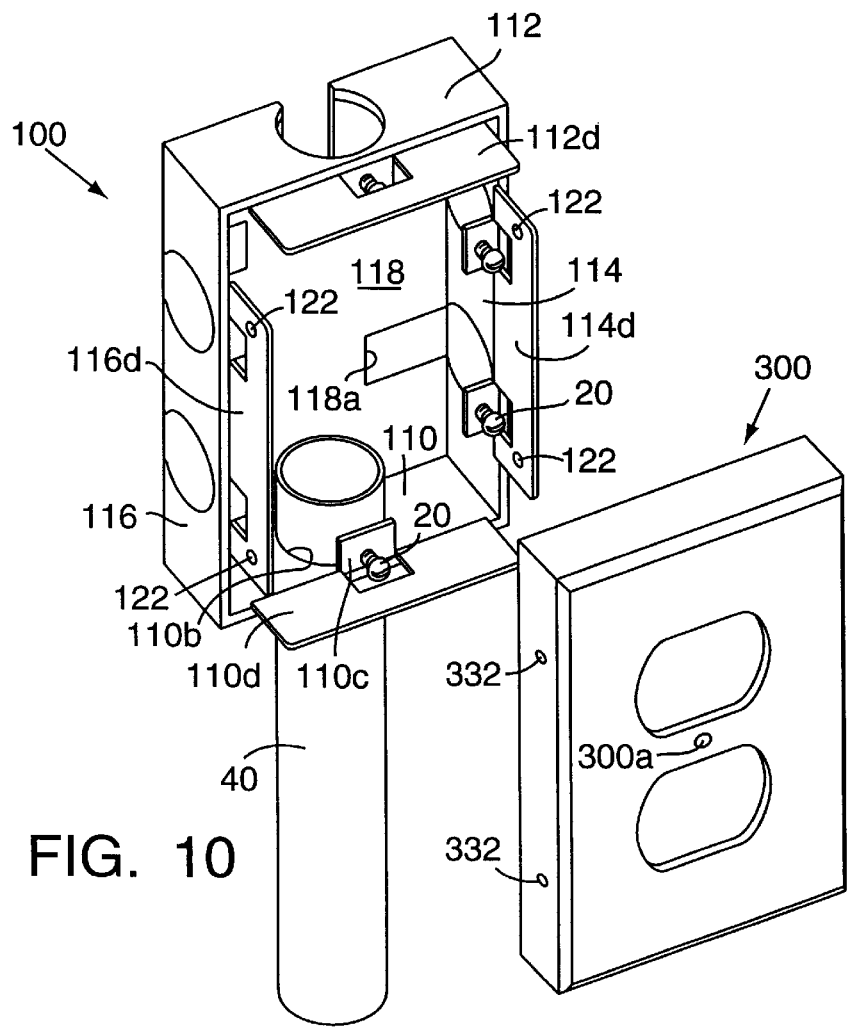
FIG. 10 is a perspective view showing various components of an electrical outlet box of alternative construction without the push-in fastener feature described with reference to FIGS. 1–9. The outlet box of FIG. 10 is adapted to be snapped together without requiring threaded fasteners for securing these components.

The base 100 of FIG. 10 is identical to the base described with reference to FIGS. 1–6. However, no legs are formed on the flanges 110d and 112d for receiving spring clips such as those shown in FIGS. 7–9. The cover 300 is snapped onto the base 100 in the same manner as the cover 30 is snapped onto the base of the previous embodiment. 50 too, the metal tubing 40 is secured to the base by a set screw 20 which is threadably received in the land 110c provided for this purpose in end wall flange 110d. No offset need be provided in the tube for the same reasons as discussed previously. The end wall 110 has a knock-out opening 110b that cooperate with a slot 118a in the bottom wall 118 of the base 100 for this purpose.

The cover 300 may differ slightly from the cover 30 of FIG. 6, and includes at least one hole 300a for receiving a threaded fastener to secure an electrical duplex plug outlet device thereto. However, the cover 300 like that of FIG. 6, does have dimples 332 that cooperate with detents 122, 122 in the base side wall flanges 114d and 116d to achieve the same interference fit between base and cover as described previously to FIGS. 1–6.

While this invention has been described in the environment of a mild steel outlet box of the type which is adapted to be stamped from sheet stock in accordance with conventional practices, it will be apparent that the invention should not be so limited, and that the invention can also be adapted for use with outlet boxes fabricated from other metals including die cast materials. The push-in fastener receiving device of the present invention can be adapted for use on a variety of such outlet boxes as long as a panel portion of the electrical outlet box cover or base is provided with a suitable inwardly projecting land or leg capable of supporting the clip portion of a fastening device constructed in accordance with the present invention.

In light of the above, it is therefore understood that within the scope of the appended claims, the invention may be practiced otherwise than as specifically described.

We claim:

1. An electrical outlet box comprising:

a metal base having an upwardly open rectangular box configuration with opposed side and opposed end walls, and with a bottom wall integrally connected to said opposed side and end walls, said bottom wall having knock-out slots provided therein, said side and end walls having knock-out openings aligned with said knock-out slots for receiving electrical tubing therein, said side and end walls also having inwardly offset panels integrally connected to said opposed side and end walls, said panels having inwardly projecting integrally formed lands spaced above said slots in said bottom wall, said lands having threaded openings to receive set screws for securing the electrical tubing in said knock-out openings and slots.

2. The electrical outlet box according to claim 1 further characterized by a cover having a rectangular configuration with side and end walls, said offset panels of said base side walls and said side walls of said cover defining a mutually cooperative interference fit for releasably securing said cover to said base without requiring conventional fasteners.

3. The electrical outlet box according to claim 2, wherein said interference fit is defined by detents in said side walls offset panels of said base and dimples in said cover side walls.

4. The electrical outlet box according to claim 3, wherein said cover has at least one opening for locating an electrical device between said cover and said base.

5. The electrical outlet box according to claim 1, wherein at least said inwardly offset panels of said end walls further include inwardly projecting legs spaced from said lands, and hardened steel fastener receiving devices slidably received by said legs, each said fastener receiving device including a clip portion for slidably receiving said legs and defining a clearance hole for loosely receiving a threaded fastener, each said fastener receiving device further including integrally formed panels which cooperate with one another to define a V- shape so oriented that the apex of the V-shape defines a slotted opening spaced from said clearance hole, said slotted opening have a width suitable for receiving the threaded fastener without requiring rotation, said fastener retaining device being fabricated from a resilient material.

6. The electrical outlet box according to claim 5, wherein said legs further include clearance openings for providing access to set screws used in securing the electrical tubing in the outlet box.

7. The electrical outlet box according to claim 6, wherein said legs further include openings for receiving the threaded fastener pushed into and through said fastener receiving device.

8. The electrical outlet box according to claim 5 further characterized by a metal cover having a rectangular configuration with side and end walls, said side walls of said panels and said side walls of said cover defining a mutually cooperative interference fit for releasably securing said cover to said base without requiring conventional fasteners.

9. An electrical outlet box comprising box defining members including a base and a cover for the base, said base being formed from a metal and defining an enclosure for an electrical device having threaded fasteners for securing the device in the enclosure, a pair of hardened steel fastener receiving devices, each of the fastener receiving devices including a U-shaped clip portion for receiving a portion of said metal base, each said clip portion having a clearance opening for loosely receiving one of the threaded fasteners, and each of the fastener receiving devices further including integrally formed panels which cooperate with one another to define a V-shape so oriented that the apex of the V-shape defines a slot opening spaced from said clearance opening, said slot opening having a width that receiving one of the threaded fasteners without requiring rotation thereof, said hardened steel fastener device being fabricated from a resilient material so that said panels forming said V-shape flex resiliently thereby exerting a clamping force on the threaded fastener so as to require unthreading of the fastener.

10. The electrical outlet box according to claim 9, wherein said box defining members snap together without requiring fasteners, said box defining members defining mutually cooperating dimples and detents that provide an interference fit therebetween.

11. The electrical outlet box according to claim 9, wherein said base has opposed side and end walls, and a bottom wall integrally connected to said opposed side and end walls, said bottom wall having knock-out slots provided therein, said side and end walls of said base having knock-out openings aligned with said knock-out slots for receiving an electrical tubing end portion therein.

12. The electrical outlet box of claim 11, wherein said side and end walls of said metal base also have inwardly offset panels integrally connected to said opposed side and end walls, said offset panels having inwardly projecting integrally formed lands spaced above said sots in said bottom wall, said lands having threaded openings to receive set screws for securing the electrical tubing in said knock-out openings and slots, and said metal base being from mild steel sheet stock that is bent to form said enclosure.

13. The electrical outlet box according to claim 12, wherein said offset panels further include inwardly projecting legs spaced above said lands, said legs including clearance openings for providing access to the set screws used in securing the tubing.

14. The electrical outlet box according to claim 13, wherein said legs define said portion of said box defining members that receives said fastener receiving devices.

15. The electrical outlet box according to claim 14, wherein said legs further include openings for receiving the set screws, said openings of said legs aligned with said clearance openings of said fastener receiving devices.

16. An electrical outlet box comprising a metal base having a bottom wall with integrally connected opposed side and end walls, inwardly offset panels integrally connected to said opposed side and end walls, and a cover of downwardly open rectangular configuration with opposed side and end walls adapted to be received and to abut said offset panels of said base side and end walls respectively, said offset panels and cover having respective portions interacting with one another so as to provide an interference fit of said cover on said base.

17. The electrical outlet box according to claim 16, wherein said bottom wall has knock-out slots provided therein, and wherein said side and end walls of said base also have knock-out opening which are aligned with the knock-out slots of said bottom wall of said base, and said offset panels having inwardly projecting lands spaced above said knock-out slots and said bottom wall, said lands having threaded openings for receiving set screws to secure electrical conduit in said knock-out opening and knock-out slots.

18. The electrical outlet box according to claim 17, wherein said inwardly offset panels associated with said end walls of said base further include inwardly projecting legs spaced from said lands, and hardened steel fastener receiving devices slidably received on said projecting legs, each said fastener receiving device including a clip portion for slidably receiving said projecting legs, and defining a clearance hole for loosely receiving a fastener, each said fastener receiving device also including integrally formed panels which cooperate with one another to define a V- shape so oriented that the apex of the V-shape defines a slotted opening spaced from said clearance hole, said slotted opening have a width suitable for receiving the threaded fastener without requiring rotation, and said fastener receiving device being fabricated from a resilient material so that said panels defining said V-shaped act on the threaded fastener in a clamping fashion so as to require unthreading of the threaded fastener.

19. The electrical outlet box according to claim 18, wherein said legs further include clearance openings for providing access to the threaded fasteners used in securing the electrical conduit in the outlet box.

20. The electrical outlet box according to claim 16, wherein said interference fit comprises abutments defined in part on said cover and in part on said offset panels.

* * * * *